(12) United States Patent
Bager

(10) Patent No.: US 10,989,250 B2
(45) Date of Patent: Apr. 27, 2021

(54) COUPLING ASSEMBLY AND WIND TURBINE COMPRISING SUCH ASSEMBLY

(71) Applicant: Vestas Wind Systems A/S, Aarhus N. (DK)

(72) Inventor: Christian Bager, Herne (DE)

(73) Assignee: Vestas Wind Systems A/S, Aarhus N. (DK)

( * ) Notice: Subject to any disclaimer, the term of this patent is extended or adjusted under 35 U.S.C. 154(b) by 298 days.

(21) Appl. No.: 16/324,282

(22) PCT Filed: Aug. 16, 2017

(86) PCT No.: PCT/DK2017/050264
§ 371 (c)(1),
(2) Date: Feb. 8, 2019

(87) PCT Pub. No.: WO2018/050184
PCT Pub. Date: Mar. 22, 2018

(65) Prior Publication Data
US 2019/0203774 A1    Jul. 4, 2019

(30) Foreign Application Priority Data

Sep. 14, 2016 (DK) .......................... PA 2016 70702

(51) Int. Cl.
*F16D 1/096* (2006.01)
*F16D 1/05* (2006.01)
(Continued)

(52) U.S. Cl.
CPC ................ *F16D 1/096* (2013.01); *F16D 1/05* (2013.01); *F16D 2001/0903* (2013.01); *F16D 2001/0945* (2013.01)

(58) Field of Classification Search
CPC ... F16D 1/05; F16D 1/09; F16D 1/093; F16D 1/095; F16C 35/063
See application file for complete search history.

(56) References Cited

U.S. PATENT DOCUMENTS 9,091,327 B2 * 7/2015 Sprenger .................. F16H 1/46
2004/0190976 A1   9/2004 Mermoz
(Continued)

FOREIGN PATENT DOCUMENTS

DE   102007056487 A1   5/2009
DE   102013224191 A1   5/2015
(Continued)

OTHER PUBLICATIONS

European Patent Office, International Search Report and Written Opinion in PCT Application No. PCT/DK2017/050264, dated Nov. 8, 2017.

(Continued)

*Primary Examiner* — Daniel J Wiley
(74) *Attorney, Agent, or Firm* — Wood Herron & Evans LLP

(57) ABSTRACT

The present invention relates to a coupling assembly (1) for fixedly connecting a rotational member (2) to an end section (3) of a hollow shaft (4). It may e.g. be used for connecting the main shaft (4) of a wind turbine (28) to a planet carrier (2) of a coaxial planetary gear system. The coupling assembly (1) comprises a shrink ring (6) and a coupling element (7). The shrink ring (6) has an outer diameter corresponding to the inner shaft diameter (d) and a conical surface (14) for connecting the shrink ring (6) and the coupling element (7). The coupling element (7) comprises an annular groove (18) with a groove diameter corresponding to the outer shaft diameter (D) and a conical surface (20) matching the shrink ring (6). When in use, the hollow shaft (4) is arranged in the groove (18) and connected to the coupling element (7) by axially extending bolts (9). Hereby a torque can be transferred by both the shrink connection and the bolts fastened into the hollow shaft. The coupling element (7) preferably (Continued)

comprises an outer flange (26) to which the rotational member (2) can be fastened.

15 Claims, 6 Drawing Sheets

(51) Int. Cl.
  *F16D 1/09* (2006.01)
  *F16D 1/094* (2006.01)

(56) References Cited

U.S. PATENT DOCUMENTS

2010/0129222 A1  5/2010  Hidding et al.
2012/0141200 A1  6/2012  Kaura et al.

FOREIGN PATENT DOCUMENTS

EP       1457673 A1   9/2004
EP       2565478 A1   3/2013
EP       3001062 A1   3/2016

OTHER PUBLICATIONS

Danish Patent and Trademark Office, Search and Exam Report in PA 2016 70702, dated Mar. 17, 2017.

\* cited by examiner

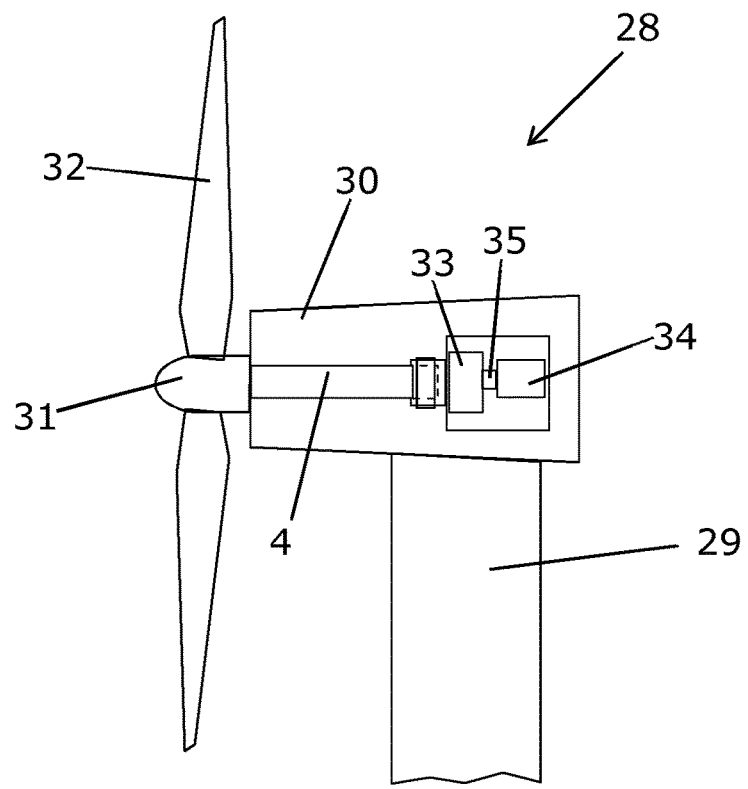
Fig. 6
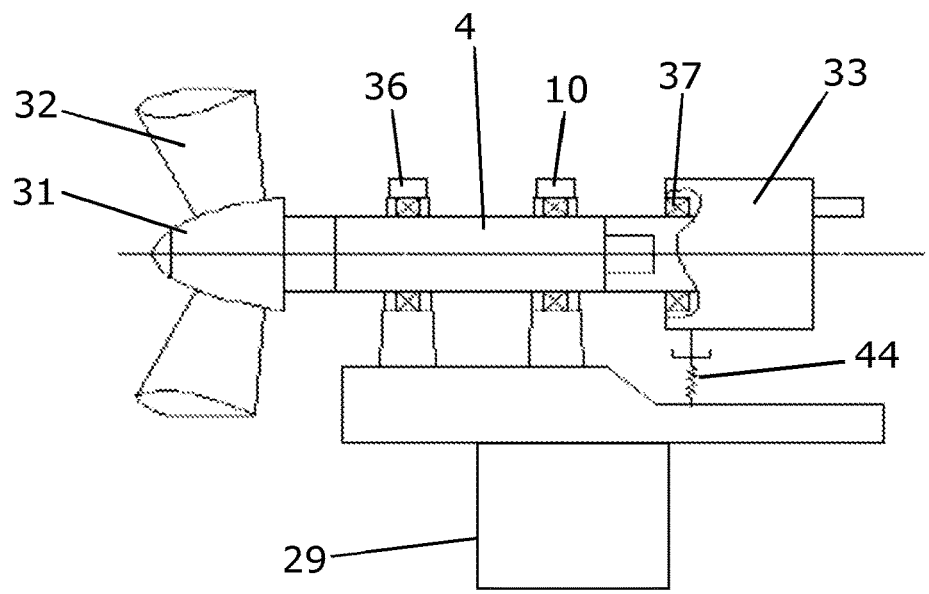
Fig. 7, prior art

US 10,989,250 B2

COUPLING ASSEMBLY AND WIND TURBINE COMPRISING SUCH ASSEMBLY

FIELD OF THE INVENTION

The present invention relates to a coupling assembly for connecting a rotational member to an end section of a hollow shaft, and in particular to such an assembly in which the connection is established via a combination of a shrink connection and further axially extending bolts. In some aspects, the invention relates to a wind turbine in which such a coupling assembly is used to connect a planet carrier of a planetary gear system to the main shaft.

BACKGROUND OF THE INVENTION

Wind turbines are used to gather wind energy and to transform the energy into another form of energy, typically electrical energy. For this purpose, most wind turbines include a main shaft which at one end is coupled to the blades of the wind turbine and at the opposite end is connected to a driven wind turbine part. This driven wind turbine part may be an input shaft of a gearbox or an input shaft or torque transferring member of an electric energy generator.

In modern wind turbines, the torque which is to be transferred in a connection between a driving member and a driven member is relatively high. The torque may lie in the interval between 500 and 15,000 kilo Newton meters. Various solutions have been provided in wind turbines in order to connect the main shaft and the driven part in a way which can sustain and transfer the high torque. One solution is to mount a so-called shrink disc around an interconnection area of the shaft and the driven part and apply the necessary pressure to transfer the loads in a friction connection. However, for hollow shafts, the establishment of such a shrink connection often results in deformation and run out of the main shaft which may cause difficulties with the fitting of the main bearings as well as with the alignment of the gearbox. These problems may be more pronounced for hollow shafts with relatively small wall thicknesses. Due to the distance from the main bearings to the centre of gravity of the gearbox, it is typically necessary to also support the gearbox with a further bearing which results in a statically over-determined system.

Hence, an improved coupling assembly would be advantageous, and in particular a more efficient and/or reliable coupling assembly would be advantageous.

OBJECT OF THE INVENTION

It is an object of the present invention to provide a coupling assembly with which a more compact design can be obtained than for known solutions.

It is another object of the present invention to provide a coupling assembly with which very large torques can be transferred also for hollow shafts having a relatively small wall thickness so that a known shrink connection would cause significant deformation.

It is an object of at least some embodiments of the present invention to provide a coupling assembly with which is easier to align the gearbox of a wind turbine than for known solutions.

It is another object of at least some embodiments of the present invention to provide a coupling assembly with which a statically over-determined design can be avoided.

It is a further object of the present invention to provide an alternative to the prior art.

In particular, it may be seen as an object of the present invention to provide a coupling assembly that solves the above mentioned problems of the prior art.

SUMMARY OF THE INVENTION

Thus, the above described object and several other objects are intended to be obtained in a first aspect of the invention by providing a coupling assembly for fixedly connecting a rotational member to an end section of a hollow shaft, the hollow shaft having a rotational axis, and the end section having an inner shaft diameter and an outer shaft diameter, the coupling assembly comprising:
  a shrink ring,
  a coupling element,
  a plurality of first bolts, and
  a plurality of second bolts;
wherein the shrink ring comprises:
  a shrink ring end surface facing away from the rotational member when the coupling assembly is in use,
  a shrink ring outer surface having an outer shrink ring diameter corresponding to the inner shaft diameter,
  a shrink ring conical surface, and
  a plurality of through-going first bores arranged circumferentially and adapted to receive the first bolts, the first bores extending from the shrink ring end surface;
and wherein the coupling element comprises:
  a first coupling element surface facing away from the rotational member when the coupling assembly is in use,
  a second coupling element surface facing towards the rotational member when the coupling assembly is in use,
  an annular groove arranged in the first coupling element surface, the annular groove comprising:
    an outer groove surface with a groove diameter corresponding to the outer shaft diameter,
    a groove conical surface matching the shrink ring conical surface, and
    a bottom surface,
  a plurality of through-going second bores arranged circumferentially and extending between the bottom surface of the groove and the second coupling element surface, and
  a plurality of first threaded holes extending at positions and orientations matching the plurality of first bores of the shrink ring when the coupling assembly is in use.

By "rotational member" is preferably meant a member which is to be rotated by a rotational movement of the hollow shaft. As will be explained in the following, the hollow shaft will typically be a driving shaft, such as a main shaft of a wind turbine. The main shaft of a wind turbine is the low-speed shaft used to transfer the rotational movement of the hub to the high-speed generator shaft via the gear box.

By "fixedly connecting" is preferably meant that the components rotate together so that the rotational speed of the rotational member becomes the same as that of the hollow shaft. It is not intended to mean that the connection cannot be disassembled again.

By "corresponding to" in relation to the diameters is preferably meant that the diameters, when taking into account the tolerances, should be so that when the coupling assembly is ready for use, a friction coupling has been established which can transfer the required torque. The actual size of this torque depends on the use of the coupling assembly. In relation to currently used wind turbines, the torque to be transferred via the coupling assembly is typically in the order of 500 and 15000 kilo Newton meters.

By "facing away from" and "facing towards" is preferably meant that a normal vector of the surface in question has a vector component parallel to a rotational axis of the rotational member. The two vector components would then be pointing in opposite directions.

The design as described above is stiffening the end of the hollow shaft to which the rotational member is connected. This is particularly relevant for hollow shafts having a relatively small wall thickness which would easily deform due to the large clamping forces involved in known coupling assemblies. For traditional shrink connections used to enable transfer of very large torques, the risk of deforming especially a hollow shaft with small wall thickness is high. With the present invention, the torque will be transferred both by the frictional connections established by the shrink ring and by the plurality of second bolts. Therefore, less tightening of the shrink connection is necessary and thereby the resulting deformation can be lower than for traditional shrink connections.

The first bores of the shrink ring may extend parallel to the rotational axis when the coupling assembly is in use. Hereby it can be obtained that the tightening of the first bolts will result in a uniform compressional force being established between the shrink ring outer surface and the inner surface of the hollow shaft. The shrink ring end surface may extend perpendicular to the rotational axis when the coupling assembly is in use. This is particular advantageous in combination with embodiments in which the first bores of the shrink ring extend parallel to the rotational axis when the coupling assembly is in use. By having the shrink ring end surface extending perpendicular to the rotational axis, a large contact area for the heads of the first bolts is obtained.

The first coupling element surface may extend perpendicular to the rotational axis when the coupling assembly is in use. In presently preferred embodiments in relation to wind turbines, the first coupling element surface is used for the alignment of a main bearing. By having a perpendicular orientation, the alignment is facilitated when the main bearing, such as a tapered roller bearing, or optionally an additional spacer element with a corresponding surface geometry is used for ensuring a predefined distance between the main bearing and the coupling element. Such an additional spacer element could e.g. be a machined distance ring used to facilitate the correct mutual positioning of the components.

The through-going second bores may extend parallel to the rotational axis when the coupling assembly is in use. These bores are used for insertion of second bolts to be fastened to third threaded holes extending from an end surface of the hollow shaft as will be explained below. As it is easiest to establish the holes in the hollow shaft parallel to the rotational axis thereof, the corresponding second holes should extend in the same direction. However, in principle it would also be possible to use other orientations of the second bolts if considered advantageous for a given loading to be transferred.

The coupling element may further comprise an outer flange extending in a direction away from the rotational axis, the outer flange comprising at least a part of the second coupling element surface. By having such an outer flange, a larger surface area is obtained for establishing the connection to the rotational member.

The coupling element may further comprise a plurality of second threaded holes extending from the second coupling element surface, the second threaded holes being adapted to receive third bolts for establishment of the connection between the rotational member and the hollow shaft. Alternatively or in combination therewith, the rotational member can be connected to the second coupling element surface by use of other means, such as gluing or welding.

In embodiments comprising such an outer flange, the second threaded holes may be provided in the outer flange, such as being circumferentially arranged. This is particularly relevant for large rotational members, but also because larger torques can be transferred for a given number and size of bolts when they are arranged at a larger distance from the rotational axis. Furthermore, a larger distance between the rotational axis and the position of the bolts gives more space for larger bolts if necessary.

In any of the embodiments as described above, the ratio between the inner shaft diameter and the outer shaft diameter is 0.5 to 0.95, such as 0.6 to 0.95, preferably 0.8 to 0.9. The advantages as described above relating to the significantly less deformation of a hollow shaft with coupling assemblies according to the present invention are particularly relevant for hollow shafts having a small wall thickness, as such shafts are more prone to deformations. This also means that a smaller wall thickness can withstand the involved deformation than what would be necessary for hollow shafts designed to have traditional shrink connections used. Especially for very large diameter shafts, the possibility of having a smaller wall thickness without exceeding an acceptable amount of deformation is advantageous as this means a lower amount of material used for the casting of the shaft. The actual dimensions to use for the hollow shaft will be determined by taking into account a number of design parameter, such as ensuring the required stiffness, keeping the amount of material used low to minimize weight and cost, and ensuring a wall thickness small enough to avoid casting errors.

In any of the embodiments as described above, the rotational member may be a planet carrier of a coaxial planetary gear. The invention could also be used for a direct drive connection.

In a second aspect, the present invention relates to a wind turbine comprising:
  a tower, a nacelle mounted on top of the tower, a hub, at least two wind turbine blades arranged on the hub, a gear box, a generator, and
  a main shaft adapted to transfer a low speed rotational movement of the hub to a high speed rotational movement of an input shaft of the generator via the gear box,
wherein the gear box comprises a planetary gear system comprising a planet carrier, and
wherein the planet carrier is connected to the main shaft via a coupling assembly as described above.

The planetary gear system used for wind turbines will typically be a co-axial gear system.

In presently preferred embodiments of wind turbines as described above, the main bearing for supporting the main shaft may be arranged in the near proximity of the first coupling element surface. This in combination with the planet carrier being mounted directly to the outer flange of the coupling element result in a very compact design. This means less material being used and thereby both less weight and lower cost of the total design as compared to known designs.

A further related effect of the compact design as well as the significantly less deformation as compared to known connections, is a minimised risk of run out and misalignment along the hollow shaft. In relation to wind turbines, this means that there is no need for an additional bearing behind the planet carrier. Hereby it is obtained that the statically indefiniteness of known systems can be avoided by at least some embodiments of the present invention.

In a third aspect, the present invention relates to a method of assembling an end section of a main shaft of a wind turbine and a planet carrier of a planetary gear system by use of a coupling assembly according to any of the preceding claims, the main shaft being provided with third threaded holes extending from an end surface of the main shaft and at positions and orientations matching the second bores of the coupling element, the method comprising the following steps:

mounting the shrink ring to the coupling element by use of the plurality of first bolts,
arranging the end section of the main shaft in the annular groove,
mounting the coupling element to the end section by use of the plurality of second bolts being screwed into the third threaded holes,
tightening the plurality of first bolts to establish a shrink connection, and
mounting the planet carrier to the coupling element.

A method and design as described above offers the possibility of mounting the main bearings on the main shaft from the rear end, i.e. the end where the planet carrier is to be fastened.

The actual torque to be transferred by the coupling assembly as described above depends on the actual application. The design process for given product thus includes determining which part of an expected loading to transfer via the shrink connection and which part to transfer via the second bolts. Furthermore, the design process includes determining an appropriate combination of a large number of other design parameters, such as dimensions, numbers of first and second bolts, inclination of the conical surfaces etc. Such a process will typically include a large number of computer simulations as well as experimental work in order to reach an optimised product. Part of the design process will typically also include determining how the method of assembling is to be carried out to ensure that the necessary torque can be transferred between the hollow shaft and the rotational member.

In some embodiments according to the third aspect of the invention, the planet carrier is mounted to the coupling element by third bolts being screwed into the second threaded holes in the outer flange.

The first, second and third aspects of the present invention may each be combined with any of the other aspects. These and other aspects of the invention will be apparent from and elucidated with reference to the embodiments described hereinafter.

BRIEF DESCRIPTION OF THE FIGURES

The coupling assembly according to the invention will now be described in more detail with regard to the accompanying figures. The figures show one way of implementing the present invention and is not to be construed as being limiting to other possible embodiments falling within the scope of the attached claim set.

FIG. 6 schematically shows a known wind turbine.

FIG. 7 schematically shows a known modular drive train of a wind turbine.

DETAILED DESCRIPTION OF AN EMBODIMENT

Figure 1:
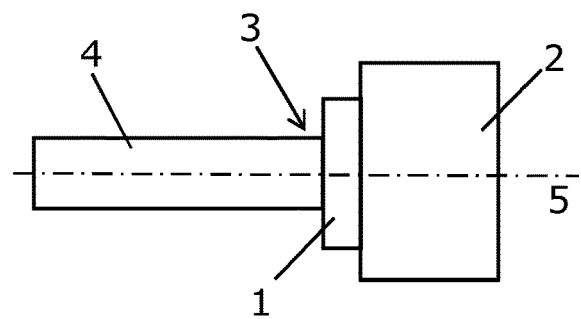
FIG. 1 schematically shows a connection between a hollow shaft and a rotational member via a coupling assembly according to the present invention.

FIG. 1 schematically shows the overall principle of using a coupling assembly 1 according to the present invention for fixedly connecting a rotational member 2 to an end section 3 of a hollow shaft 4 so that the rotational member 2 rotates together with the hollow shaft 4 around a rotational axis 5. In relation to wind turbines, such a hollow shaft may e.g. be made by casting, such as made from cast iron GGG40 which is a low grade of ductile iron.

Figure 2:
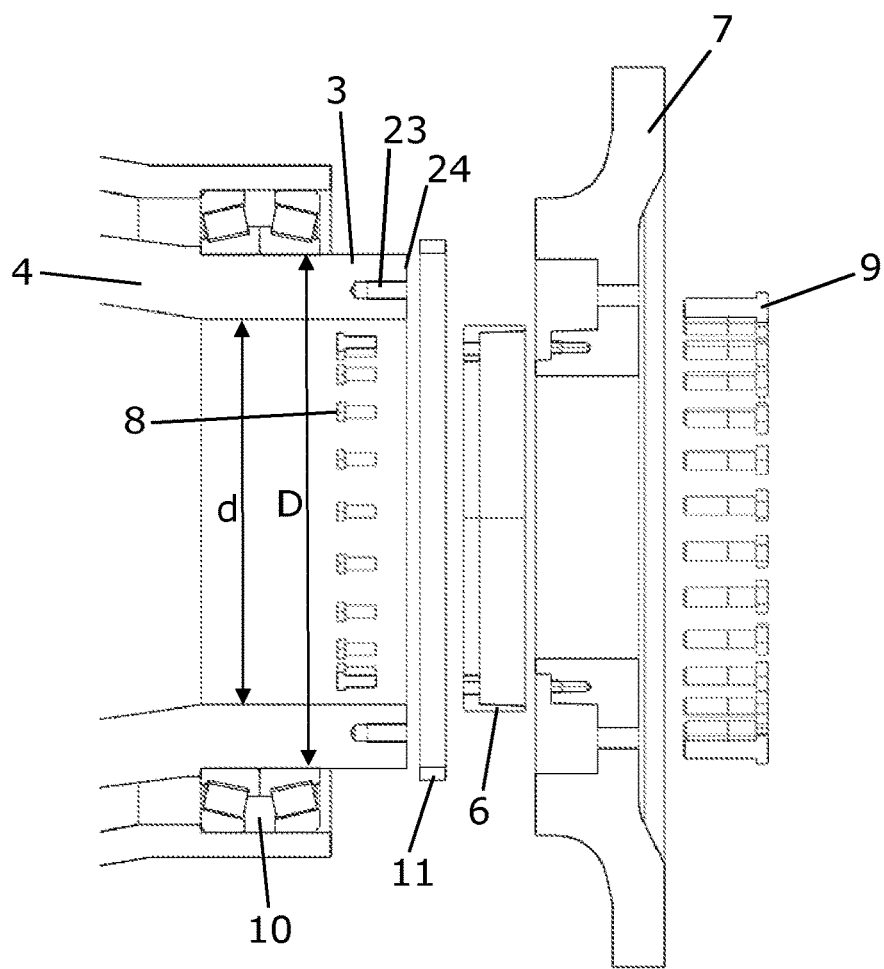
FIG. 2 schematically shows a cross-sectional and exploded view of a coupling assembly according to the present invention.
Figure 3:
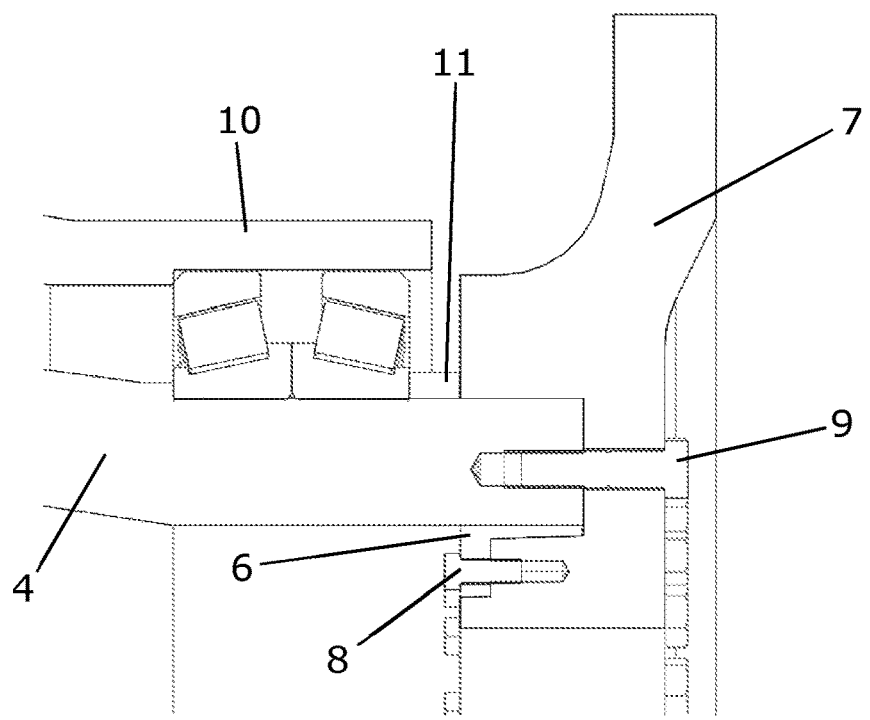
FIG. 3 is a partial enlarged view of a section of FIG. 2 after assembly of the parts.

FIG. 2 schematically shows an embodiment of the invention, and FIG. 3 shows an enlarged view of a part of the coupling assembly in FIG. 2. In FIG. 2, the parts are shown in exploded view as before assembly, and in FIG. 3, the coupling assembly is shown in the assembled condition. The end section 3 of the hollow shaft 4 has an inner shaft diameter d and an outer shaft diameter D. The coupling assembly 1 comprises a shrink ring 6, a coupling element 7, a plurality of first bolts 8, and a plurality of second bolts 9. When the coupling assembly 1 is assembled and ready for use, the rotational axis of the shrink ring 6 and the rotational axis of the coupling element 7 are coincident with the rotational axis 5 of the hollow shaft 4; see FIG. 1. Therefore, only one rotational axis will be referred to in the following. The plurality of first bolts 7 and second bolts 9 are preferably arranged circumferentially at one distance from the rotational axis 5 for the first bolts 7 and at one other distance from the rotational axis for the second bolts 9. However, it would also be possible e.g. to arrange the second bolts 9 on two circles provided that the wall thickness of the hollow shaft 4 is large enough to accommodate for this.

FIGS. 2 and 3 also show a bearing 10 arranged to support the end section 3 of the hollow shaft 4. In relation to wind turbines as will be described later, this bearing 10 will be the rear end main bearing. The correct positioning of the bearing 10 in relation to the coupling assembly 1 can be facilitated by arranging a spacer element 11, such as a distance ring, between the bearing 10 and the coupling element 7.

Figure 4:
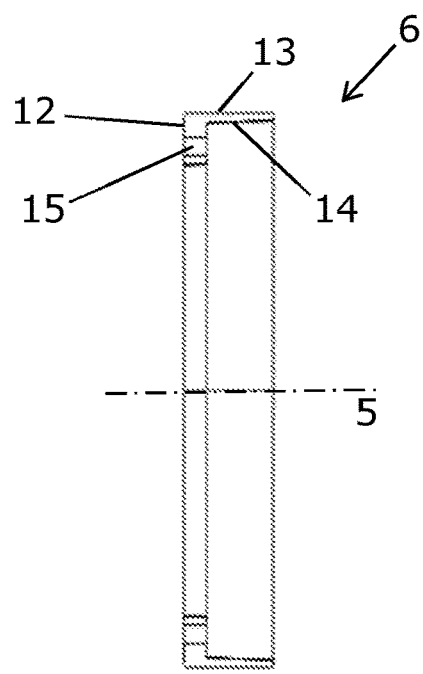
FIG. 4 is a cross-sectional view of the shrink ring of the coupling assembly in FIG. 2.

FIG. 4 schematically shows a cross sectional view of a shrink ring 6, such as the one in FIG. 2. It comprises a shrink ring end surface 12, a shrink ring outer surface 13, and a shrink ring conical surface 14. The outer shrink ring diameter corresponds to the inner shaft diameter d as can more clearly be seen in FIGS. 2 and 3. The shrink ring 6 further has a plurality of through-going first bores 15 arranged circumferentially and extending from the shrink ring end surface 12. The first bores 15 are arranged and dimensioned so that they are adapted to receive the first bolts 8 as shown in FIGS. 2 and 3.

Figure 5:
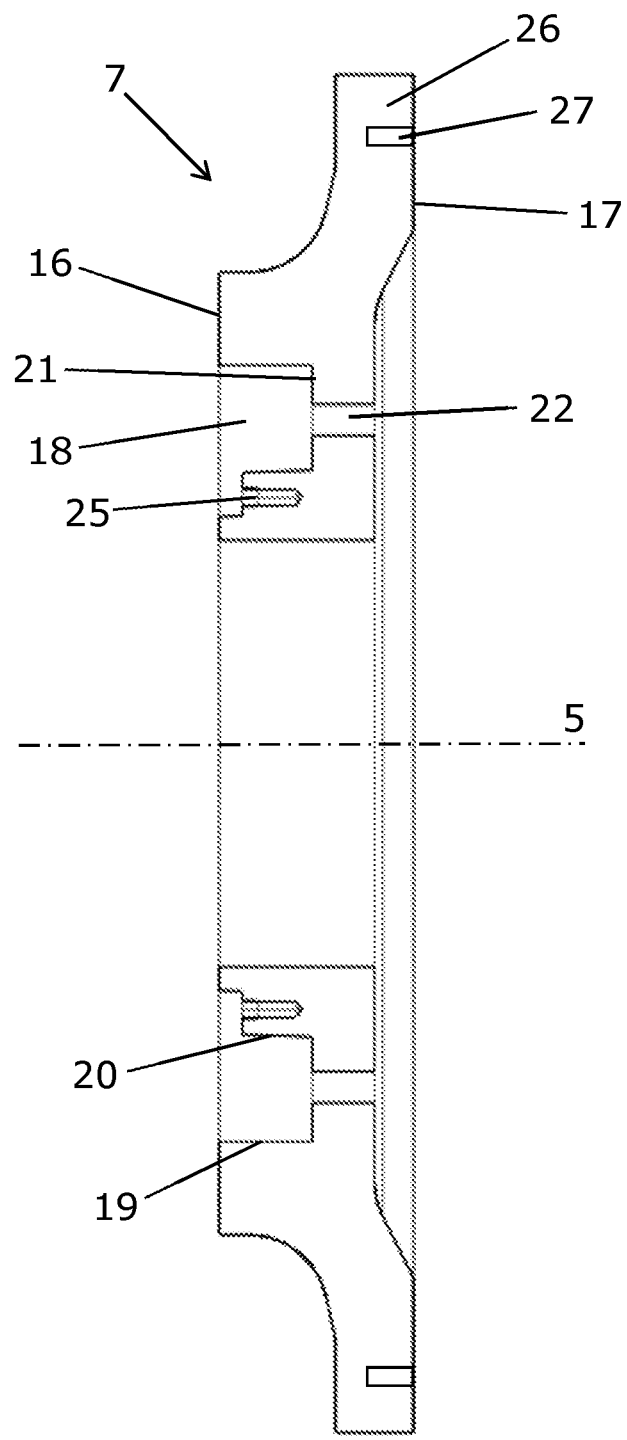
FIG. 5 is a cross-sectional view of a coupling element of the coupling assembly in FIG. 2.

FIG. 5 schematically and in cross-sectional view shows an embodiment of the coupling element 7. It comprises a first coupling element surface 16 facing away from the rotational member 2 when the coupling assembly 1 is in use, and a second coupling element surface 17 facing towards the rotational member 2 when the coupling assembly 1 is in use. It further comprises an annular groove 18 arranged in the first coupling element surface 16. When the coupling element 7 is in use, the end section 3 of the hollow shaft 4 is arranged in the annular groove 18 as shown in FIG. 2. The annular groove 18 comprises an outer groove surface 19 with a groove diameter corresponding to the outer shaft diameter D, a groove conical surface 20 matching the shrink ring conical surface, and a bottom surface 21. It further comprises a plurality of through-going second bores 22 arranged circumferentially and extending between the bottom surface 21 of the groove 18 and the second coupling element surface 17. These second bores 22 are used for the establishment of the bolted connection to the end section 3 of the hollow shaft 4 by screwing second bolts 9 into threaded holes 23 extending from an end surface 24 of the hollow shaft 4 as shown in FIGS. 2 and 3. The connection between the shrink ring 6 and the coupling element 7 is established by first bolts 8 being inserted into a plurality of first threaded holes 25 extending at positions and orientations matching the plurality of first bores 15 of the shrink ring 6 when the coupling assembly 1 is in use. The shrink ring 6 and the coupling element 7 may be made from a number of materials, and the materials to use will be determined as part of the design process. One example would be 42CrMo4.

In the embodiment of the invention shown in FIGS. 2 to 5, when the coupling assembly 1 is in use, the first bores 15 of the shrink ring 6 extend parallel to the rotational axis 5, the shrink ring end surface 12 extends perpendicular to the rotational axis, the first coupling element surface 16 extends perpendicular to the rotational axis, and the through-going second bores 22 extend parallel to the rotational axis. However, other orientations of the bores and or the surfaces are also covered by the invention as long as the overall functioning of the coupling assembly is accordance with the claimed invention.

As seen from the above description, the shrink ring 6 is positioned and adapted to lock the hollow shaft 4 to the coupling element 7 by transferring torque between the neighbouring surfaces by friction by providing pressure to the surfaces of the interconnection. The pressure is provided by tightening the first bolts 8 whereby the shrink ring 6 and the coupling element 7 are mutually moved in a direction parallel to the rotational axis. Due to the conical surfaces 14,20, the compressional force increases as the first bolts 8 are tightened.

In the embodiment shown in FIGS. 2 and 5, the coupling element 7 further comprises an outer flange 26 extending in a direction away from the rotational axis 5. This outer flange 26 comprises at least a part of the second coupling element surface 17 to which the rotational member 2 is mounted. In the embodiments shown, the part of the coupling element 7 where the heads of the second bolts 9 are placed after assembly is recessed. Hereby it becomes possible to have a plane end surface of the rotational member 2 arranged up against the second coupling element surface 17. However, in other designs the geometry of a rotational member could allow the necessary space for the second bolts 9, so that the second coupling element surface 17 could be plane.

The present invention was made in relation to wind turbines and for connecting the main shaft of the wind turbine to the planet carrier of a gearbox, such as a coaxial planetary gear. The torque to be transferred for this application is very large, and for this purpose, the connection between the planet carrier and the coupling element 7 will typically be made by a plurality of bolts. In a preferred embodiment, the coupling element 7 therefore further comprises a plurality of second threaded holes 27 extending from the second coupling element surface 17, the second threaded holes 27 being adapted to receive third bolts (not shown) for the establishment of the connection between the rotational member 2 and the hollow shaft 4 via the coupling assembly 1. In the illustrated embodiment, the second threaded holes 27 are provided in the outer flange 26. Alternatively or in combination therewith, the outer flange 26 could be provided with through-going third bores (not shown), and the corresponding threaded holes (not shown) could then be in the rotational member 2. This alternative would be advantageous for bulky rotational members 2 leaving too little space for insertion and tightening of the bolts.

FIG. 6 schematically shows an example of a known wind turbine 28. It comprises a tower 29 with a nacelle 30 mounted thereon, a hub 31, at least two wind turbine blades 32 arranged on the hub 31, a gear box 33, a generator 34, and a main shaft 4 adapted to transfer a low speed rotational movement of the hub 31 to a high speed rotational movement of an input shaft 35 of the generator 34 via the gear box 33. Typically, the hub 31 has three blades 32 attached thereto. The torque to be transferred is resulting from a force provided by the wind to the blades 32 and via the main shaft 4. It also results from resistance provided by the system for generating energy. In addition to the torque to be transferred, the connection should also be able to withstand the transferral of bending moments and axial loading due to the various forces involved in the operation of the wind turbine 28.

FIG. 7 schematically shows a drive train of a known wind turbine. The main shaft 4 is supported by two main bearings, called a front bearing 36 and a rear bearing 10, and the gear box 33 is supported by a third bearing 37 and a gear stay 44; the gear stay is shown schematically. This design has a high axial stiffness and an optimal load distribution between the front and rear bearings 36,10 also with respect to the position in relation to the tower 29. On the other hand, the set-up is statically over-determined, because there are more bearings than actually needed to be statically determined.

Figure 8:
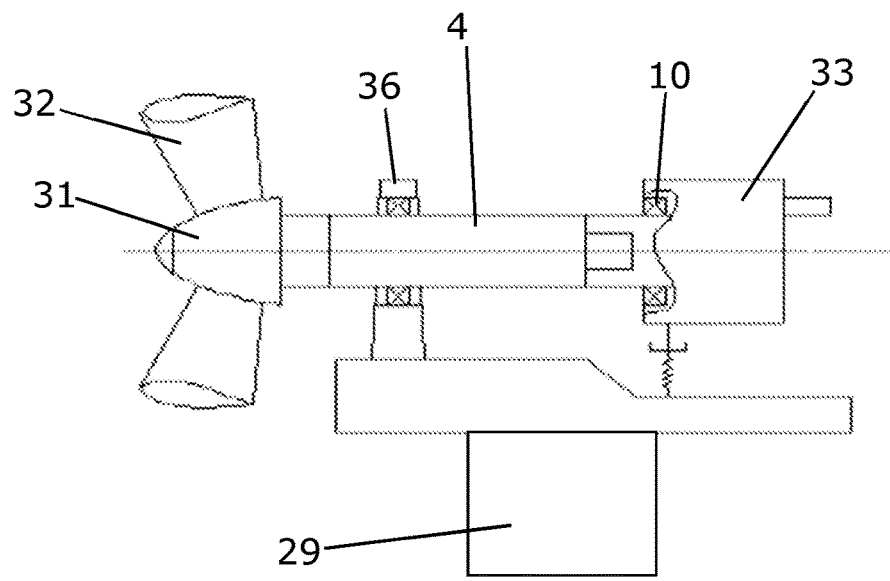
FIG. 8 schematically shows a modular drive train including the use of a coupling assembly according to the present invention.
Figure 9:
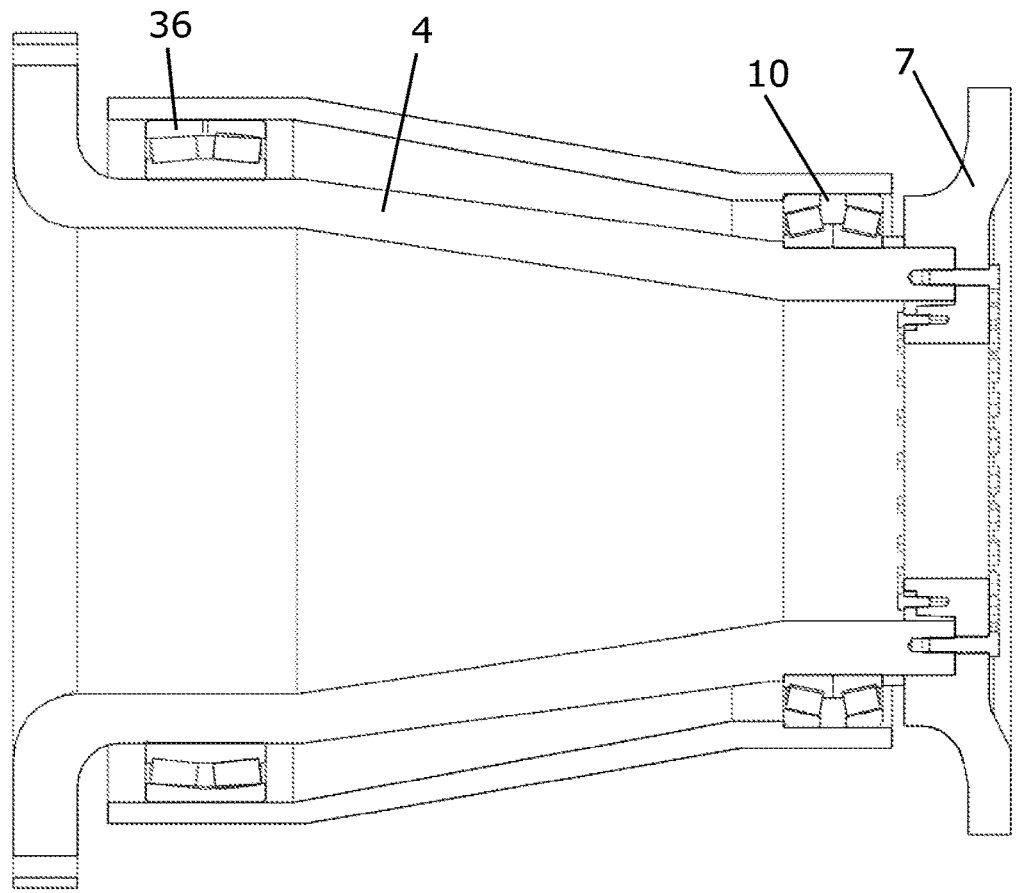
FIG. 9 shows a possible design of a drive train of a wind turbine including a coupling assembly according to the present invention.

The very compact design obtainable with the present invention has a number of advantages. If a main objective for a given application is to avoid deformation of the hollow shaft 4, an alternative would be to have most of the torque transferred by the second bolts 9. However, then very strong and thus expensive bolts would be necessary. FIG. 8 schematically shows a drive train of a wind turbine 28 wherein the planet carrier is connected to the main shaft 4 via a coupling assembly 1 according to the present invention as described above. The planet carrier is not directly visible in FIG. 8 but is part of the gear box 33. The rear bearing 10 for supporting the main shaft 4 is arranged in the near proximity of the first coupling element surface 16 as more clearly shown in FIGS. 2 and 3. An example of a specific design of a main shaft 4 for a wind turbine 28 and a coupling assembly 1 according to the present invention is shown in FIG. 9. As shown in the figures, the rear main bearing 10 can be arranged very close to the coupling assembly 1, and the first coupling element surface 16 can be used for the correct mutual alignment of the components; this was explained above. The third bearing 37 and the gear stay 44 used in known drive trains can be avoided with the compact design of a coupling assembly according to the present invention. Calculations made in relation to the present invention have shown that the weight of the main shaft 4 can be reduced by in the order of 40% which is highly advantageous with respect to both amount of material used as well as the cost of transportation and handling. This has become possible, because the torque is to be transferred by both the shrink connection and the second bolts 9. This means that the shrink connection is to carry less torque than for a known connection, and thereby less deformation of the main shaft 4 takes place during the establishment of the connection. This decrease in deformation as compared to known solutions is particularly advantageous for hollow shafts having a relatively small wall thickness.

Figure 10:
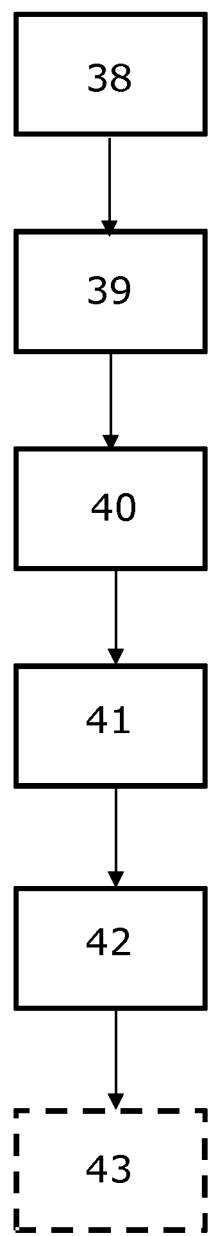
FIG. 10 is a flow-chart of a method according to the invention.

FIG. 10 is a flow chart of a method of assembling an end section 3 of a main shaft 4 of a wind turbine 28 and a planet carrier 2 of a planetary gear system by use of a coupling assembly according to the present invention. The main shaft 4 is provided with third threaded holes 27 extending from an end surface 24 of the main shaft 4 and at positions and orientations matching the second bores 22 of the coupling element 7. The method comprising the following steps:

mounting 38 the shrink ring 6 to the coupling element 7 by use of the plurality of first bolts 8, arranging 39 the end section 3 of the main shaft 4 in the annular groove 18, mounting 40 the coupling element 7 to end section 3 by use of the plurality of second bolts 9 being screwed into the third threaded holes 23, tightening 41 the plurality of first bolts 8 to establish a shrink connection, and mounting 42 the planet carrier 2 to the coupling element 7.

In embodiments where the coupling element 7 comprises an outer flange 26, the method may further comprise the step of mounting 43 the planet carrier 2 to the coupling element 7 by third bolts being screwed into the second threaded holes 27 in the outer flange 26.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A coupling assembly for fixedly connecting a rotational member to an end section of a hollow shaft, the hollow shaft having a rotational axis, and the end section having an inner shaft diameter and an outer shaft diameter, the coupling assembly comprising:
    a shrink ring,
    a coupling element,
    a plurality of first bolts, and
    a plurality of second bolts;
wherein the shrink ring comprises:
    shrink ring end surface facing away from the rotational member when the coupling assembly is in use,
    shrink ring outer surface having an outer shrink ring diameter corresponding to the inner shaft diameter,
    shrink ring conical surface, and
    a plurality of through-going first bores arranged circumferentially and adapted to receive the first bolts, the first bores extending from the shrink ring end surface;
and wherein the coupling element comprises:
    a first coupling element surface facing away from the rotational member when the coupling assembly is in use,
    a second coupling element surface facing towards the rotational member when the coupling assembly is in use,
    an annular groove arranged in the first coupling element surface, the annular groove comprising:
        an outer groove surface with a groove diameter corresponding to the outer shaft diameter,
        a groove conical surface matching the shrink ring conical surface, and
        a bottom surface,
    a plurality of through-going second bores arranged circumferentially and extending between the bottom surface of the groove and the second coupling element surface, and
    a plurality of first threaded holes extending at positions and orientations matching the plurality of first bores of the shrink ring when the coupling assembly is in use.

2. The coupling assembly according to claim 1, wherein the first bores of the shrink ring extend parallel to the rotational axis when the coupling assembly is in use.

3. The coupling assembly according to claim 1, wherein the shrink ring end surface extends perpendicular to the rotational axis when the coupling assembly is in use.

4. The coupling assembly according to claim 1, wherein the first coupling element surface extends perpendicular to the rotational axis when the coupling assembly is in use.

5. The coupling assembly according to claim 1, wherein the through-going second bores extend parallel to the rotational axis when the coupling assembly is in use.

6. The coupling assembly according to claim 1, wherein the coupling element further comprises an outer flange extending in a direction away from the rotational axis, the outer flange comprising at least a part of the second coupling element surface.

7. The coupling assembly according to claim 1, wherein the coupling element further comprises a plurality of second threaded holes extending from the second coupling element surface, the second threaded holes being adapted to receive third bolts for establishment of the connection between the rotational member and the hollow shaft.

8. The coupling assembly according to claim 7, wherein the second threaded holes are provided in the outer flange.

9. The coupling assembly according to claim 1, wherein the ratio between the inner shaft diameter and the outer shaft diameter is 0.5 to 0.95.

10. The coupling assembly according to claim 1, wherein the rotational member is a planet carrier of a coaxial planetary gear.

11. A wind turbine comprising:
    a tower, a nacelle mounted on top of the tower, a hub, at least two wind turbine blades arranged on the hub, a gear box, a generator, and a main shaft adapted to transfer a low speed rotational movement of the hub to a high speed rotational movement of an input shaft of the generator via the gear box,
wherein the gear box comprises a planetary gear system comprising a planet carrier, and
wherein the planet carrier is connected to the main shaft via a coupling assembly according to claim 10.

12. The wind turbine according to claim 11, wherein the planetary gear system is a co-axial gear system.

13. The wind turbine according to claim 11, wherein a main bearing for supporting the main shaft is arranged in the near proximity of the first coupling element surface.

14. A method of assembling an end section of a main shaft of a wind turbine and a planet carrier of a planetary gear system by use of a coupling assembly according to claim 1, the main shaft being provided with third threaded holes extending from an end surface of the main shaft and at positions and orientations matching the second bores of the coupling element, the method comprising the following steps:

mounting the shrink ring to the coupling element by use of the plurality of first bolts, arranging the end section of the main shaft in the annular groove, mounting the coupling element to end section by use of the plurality of second bolts being screwed into the third threaded holes, tightening the plurality of first bolts to establish a shrink connection, and mounting the planet carrier to the coupling element.

15. The method according to claim 14, wherein the planet carrier is mounted to the coupling element by third bolts being screwed into the second threaded holes in the outer flange.

* * * * *